United States Patent
Neumaier et al.

(10) Patent No.: US 8,567,039 B2
(45) Date of Patent: Oct. 29, 2013

(54) MACHINE TOOL AND PROCESS FOR MACHINING A WORKPIECE

(75) Inventors: Josef Neumaier, Pfronten (DE); Thomas Lochbihler, Vils (AT); Uwe-Carsten Hansen, Eisenberg (DE)

(73) Assignee: Deckel Maho Pfronten GmbH, Pfronten (DE)

( * ) Notice: Subject to any disclaimer, the term of this patent is extended or adjusted under 35 U.S.C. 154(b) by 828 days.

(21) Appl. No.: 12/700,983

(22) Filed: Feb. 5, 2010

(65) Prior Publication Data

US 2010/0221079 A1 Sep. 2, 2010

(30) Foreign Application Priority Data

Feb. 9, 2009 (DE) .......................... 10 2009 008120

(51) Int. Cl.
*B23Q 41/00* (2006.01)
(52) U.S. Cl.
USPC ........ 29/564; 29/33 R; 409/2; 409/4; 409/10; 409/61; 409/91; 700/159
(58) Field of Classification Search
USPC .......... 29/564, 33 R; 409/2, 61, 10, 4, 91, 94; 700/159
See application file for complete search history.

(56) References Cited

U.S. PATENT DOCUMENTS

| | | | |
|---|---|---|---|
| 5,055,752 A | 10/1991 | Leistensnider et al. | |
| 5,091,861 A | 2/1992 | Geller et al. | |
| 5,297,055 A * | 3/1994 | Johnstone | 700/195 |
| 5,309,646 A | 5/1994 | Randolph, Jr. et al. | |

(Continued)

FOREIGN PATENT DOCUMENTS

| | | |
|---|---|---|
| DE | 40 16 441 A1 | 11/1991 |
| DE | 43 26 988 A1 | 2/1995 |

(Continued)

OTHER PUBLICATIONS

Yao-Wen Hsueh et al., "Automatic Selection of Cutter Orientation for Preventing the Collision Problem on a Five-Axis Machining." (Original Article), The International Journal of Advanced Manufacturing Technology, Apr. 13, 2006, pp. 66-77, XP019488033, vol. 32, No. 1-2, Springer, Berlin, DE.

(Continued)

*Primary Examiner* — Livius R Cazan
*Assistant Examiner* — Azm Parvez
(74) *Attorney, Agent, or Firm* — Oliff & Berridge, PLC

(57) ABSTRACT

The present invention relates to a machine tool and a corresponding process for machining a workpiece by means of one or more tools controlled by means of control data, the machine tool comprising at least 5 simultaneously controllable axes. A control device being suited to control the tool supported in a support means by means of the control data along a tool path to remove material from the workpiece clamped in a clamping means. The machine tool being suited to machine a first workpiece to provide the first workpiece with a first gearing, the first workpiece being a counter piece to a second workpiece having a second gearing. The machine tool also comprising a test system suited to determine after and/or during the machining of the first workpiece on the machine tool whether a current geometry, in particular a current tooth flank geometry and/or current tooth gap geometry, of the first gearing of the first workpiece differs from a target gearing geometry, in particular from a target tooth flank geometry and/or target tooth gap geometry, of the first gearing of the first workpiece.

20 Claims, 3 Drawing Sheets

(56) References Cited

U.S. PATENT DOCUMENTS

| | | | |
|---|---|---|---|
| 5,923,561 | A | 7/1999 | Higasayama et al. |
| 6,170,157 | B1 | 1/2001 | Munk et al. |
| 6,311,098 | B1 | 10/2001 | Higasayama et al. |
| 7,153,183 | B2 * | 12/2006 | Kopp et al. ............ 451/5 |
| 2006/0090336 | A1 | 5/2006 | Graham et al. |
| 2010/0111628 | A1 | 5/2010 | Megens et al. |
| 2010/0176099 | A1 | 7/2010 | Hilderbrand et al. |

FOREIGN PATENT DOCUMENTS

| | | |
|---|---|---|
| DE | 691 13 502 T2 | 3/1996 |
| DE | 196 31 620 A1 | 2/1998 |
| DE | 692 21 088 T2 | 2/1998 |
| DE | 100 31 441 A1 | 3/2002 |
| DE | 103 22 342 A1 | 12/2004 |
| DE | 103 30 828 A1 | 2/2005 |
| DE | 20 2007 002 379 U1 | 6/2007 |
| DE | 20 2007 012 450 U1 | 12/2007 |
| DE | 10 2007 016 056 A1 | 10/2008 |
| DE | 10 2007 019 951 A1 | 10/2008 |
| EP | 1 114 694 A1 | 7/2001 |
| JP | A-2000-141129 | 5/2000 |
| WO | WO 2007/031337 A1 | 3/2007 |
| WO | WO 2008/133517 A1 | 11/2008 |

OTHER PUBLICATIONS

Chih-Hsing Chu et al., "Five-Axis Flank Machining of Ruled Surfaces with Developable Surface Approximation," (Article), Ninth International Conference on Computer Aided Design and Computer Graphics, 2005, IEEE, pp. 1-6, Hsinchu, Taiwan.
Oct. 18, 2012 Office Action issued in U.S. Appl. No. 12/702,886.
European Search Report dated Dec. 21, 2010 issued in European Patent Application No. 10 15 3085.5 (with translation).
Schossig, "The Easy Way to Good Teeth: Mill High-Quality Gear Wheels on Standard machines,"*Werkstatt und Betrieb*, 2007, pp. 28-30 and 32, No. 4/28, Carl Hanser Verlag, Munich, Germany.
Langmann, Pocketbook of Automation, 2004, pp. 462-467, Fachbuchverlag Leipzig in Carl Hanser Verlag.
Kief et al., *NC/CNC Manual* 2007/2008, pp. 114-119, 128, Carl Hanser Verlag, Munich, Germany.
Jan. 27, 2010 Office Action issued in German Patent Application No. DE 10 2009 008 120.8.
Jan. 28, 2010 Office Action issued in German Patent Application No. DE 10 2009 008 121.6.
Feb. 24, 2010 Office Action issued in German Patent Application No. 10 2009 008 124.0.
Nov. 3, 2010 Office Action issued in German Patent Application No. 10 2009 008 122.4.
"CVNC™-M3 Benutzerhandbuch," CADD® 5*i* Revision 10,0, Parametric Technology Corporation, pp. III-XXII 2-47 to 2-49, 2-66, 4-2, 4-3, 5-6 and 5-16 to 5-20.
CVNC™-Fräsen Befehlsverzeichnis, CADDS® 5 Revision 9.1, Parametric Technology Corporation, pp. III-XXIII, 1-137, 1-233, 1-234, and 1-452.
"NC Builder™ Benutzerhandbuch," CADDS® 5 Revision 9.0, Parametric Technology Corporation, pp. III-XIX,1-2, 2-12, 2-13, 2-30 and Chapter 3.
"CVNC™-M3 User Guide," CADDS® 5i Release 14, Parametric Technology Corporation.
"CVNC™ Milling Command Reference," CADDS® 5*i* Release 14, Parametric Technology Corporation.
"NC Builder™ User Guide and Menu Reference," CADDS® 5 Revision 9.0, Parametric Technology Corporation.
U.S. Appl. No. 12/702,886, filed Feb. 9, 2010 in the name of Josef Neumaier et al.
U.S. Appl. No. 12/702,837, filed Feb. 9, 2010 in the name of Josef Neumaier et al.
U.S. Appl. No. 12/702,619, filed Feb. 9, 2010 in the name of Josef Neumaier et al.
Ren, Y., et al. "Clean-Up Tool Path Generation by Contraction Tool Method for Machining Complex Polyhedral Models," Computers in Industry, Elsevier Science Publishers, vol. 54, pp. 17-33.
Apr. 6, 2011 Search Report issued in European Patent Application No. 10153082.2 with partial translation.

* cited by examiner

MACHINE TOOL AND PROCESS FOR MACHINING A WORKPIECE

The present invention relates to a machine tool and a process for machining a workpiece using one or more tools controlled by means of control data.

In particular, the present invention relates to a machine tool for the program-controlled machining of a workpiece using one or more tools controlled by means of control data, the machine tool comprising at least 5 simultaneously controllable axes and also a clamping means for clamping the workpiece and a control device having a support means for supporting one of the one or more tools of the machine tool, in particular the control device of the machine tool being suited to control the tool supported in the support means by means of control data along a tool path to remove material from the workplace clamped in the clamping means.

In particular, the present invention relates to a machine tool and a process for the program-controlled machining of a workplace to provide the first workpiece with a first gearing, in particular to machine the workplace from a blank into a finished part having a first gearing, the first workpiece being in particular a counter piece to a second workpiece having a second gearing such that a first tooth flank of the first gearing forms a mating flank of a second tooth flank of the second gearing.

In particular, the present invention relates to a machine tool and a process for the production of one or more workpieces on the machine tool from a blank into a finished part having a gearing, in particular gear wheels, such as a spur gear having an internal gearing, a spur gear having an external gearing or a bevel gear, and also toothed racks, on a program-controlled machine tool comprising at least 5 axes, in particular a CNC machine tool comprising at least 5 axes. In particular, the present invention relates to the complete machining of a blank into a finished part having a gearing on a CNC machine tool.

BACKGROUND OF THE INVENTION

The prior art discloses CNC-controlled machine tools comprising at least 5 axes and enabling the free movement of a tool in 5 degrees of freedom through the space to remove material from the workpiece. The 5 degree of freedom movements here comprise the at least three spatial degrees of freedom (conventionally three orthogonally controllable spatial degrees of freedom, in particular referred to as the x-axis, y-axis and z-axis) which can be controlled by at least three linear axes, and at least two angular or rotational degrees of freedom which enable any tool orientation. The angular and rotational degrees of freedom can here be controlled by two or more rotational axes of the machine tool.

Today's CNC machine tools having at least 5 axes enable the simultaneous control of the 5 degrees of freedom so as to make possible particularly complex and efficient tool paths relative to a clamped workpiece. In addition, the prior art discloses CNC machine tools having 6 axes on which 3 linear axes and 3 rotational axes can simultaneously be controlled. CNC machine tools having more than 6 axes are also possible.

The above described CNC machine tools are universally used in tool construction to produce finished parts having a complex geometry efficiently and precisely by means of machining. In mechanical engineering, in particular in shipbuilding, for example, in the environmental technology (e.g. in the case of wind power plants), in aviation and in machine tool manufacture, it may also be necessary to provide transmissions having the most different outputs, for which gear wheels, in particular spur gears and bevel gears, have to be produced according to different demands made on surface finish, tooth contact pattern and running characteristics and/or rolling characteristics. Here, it is often not absolutely necessary to obtain a large number of items but it is rather imperative to achieve a high flexibility with respect to the broad range of types, in particular with respect to individual geometries comprising complex flank geometries and complex tooth flank geometries.

For the production of finished parts having a gearing, in particular gear wheels, such as spur gears or bevel gears, and also toothed racks, the prior art discloses special machine tools which are equipped with special tools to produce tooth profiles of gear wheels, such as spur gears or bevel gears, in different embodiments. As special machines for the production of a gearing of gear wheels or toothed racks, the prior art particularly discloses hobbing machines suited to provide a workpiece with a gearing in a hobbing process by means of hobbing tools.

Such special machines, in particular the above described hobbing machines, are cost-intensive as regards purchase and maintenance and the manufacture of individual flank profiles is limited by the shape of the special tools, e.g. the special shape of the cutter of the hobbing tools of hobbing machines, which already predefines an achievable or producible tooth and flank geometry. Moreover, the manufacture of individual flank profiles on the above described special machines is limited by the restricted degrees of freedom in a possible relative movement between workpiece and tool.

To achieve a high surface finish it is also optionally necessary to remachine or finish the workpieces after the machining operation on the above described special machines, e.g. on additional special machines.

In order to solve the problems of the above mentioned special machines, in particular the hobbing machines, for the production of gear wheels, in particular spur gears or bevel gears, or toothed racks, it is useful to produce such gear wheels, in particular spur gears or bevel gears, on a CNC-controlled machine tool comprising at least 5 axes.

This enables the use of standard tools for the production of these finished parts, the most complex geometries, in particular the most complex flank profiles, which extend beyond the possibilities on special machines known to date being enabled with gear wheels, such as spur gears or bevel gears, by the high flexibility and the broad field of application of a machine tool controllable in at least 5 degrees of freedom.

A process for machining a workpiece for the production of a predetermined gear wheel on a machine tool comprising at least 5 axes is described in the article "*Auf einfachem Weg zu guten Zähnen—Zahnräder mit holier Qualität auf Standard-maschinen fräsen*" [the easy way to good teeth—mill high-quality gear wheels on standard machines] by Hans-Peter Schossig (published in the journal *Werkstatt unci Betrieb*, Carl Hanser Verlag, Munich, 2007 edition, No. 4/28, pages 28-32, ISSN 0043-2792).

This above mentioned article describes a process for the production of gear wheels by means of a machine tool comprising 5 axes, in particular in the test run for the production of a bevel gear pairing having a surface finish of gearing quality 6 according to DIN 3965. In the described process, all necessary parameters of the gearing according to DIN standard are initially inputted. This corresponds to fundamental geometry parameters of the finished part geometry of the finished part. For this purpose, it is e.g. also possible to input quantitative data on a desired tooth contact pattern in the case of a predetermined or required tooth shape or further data on a desired convexity or further data concerning a curvature in individual areas or over the entire tooth flank or the entire tooth flank profile. Here, prior to the actual machining operation a target geometry of the gearing is given or determined, in particular a desired tooth flank geometry and/or desired tooth gap geometry, for example.

These fundamental geometry parameters are typed in a computer terminal and then a mathematical description of the desired tooth geometry is generated in the computer by mathematical and/or numerical calculations. By means of a CAD/CAM system, an NC program is generated based on the computer result according to which the 5-axis machine tool can produce the desired finished part using standard tools, in particular e.g. a known end mill. A similar process is also shown in WO 2008/133517 A1, for example.

The above described production processes for finished parts having such gearings on a machine tool comprising at least 5 axes, in particular for the production of gear wheels, here involve the problem that after the machining operation on the machine tool it has to be determined whether the predetermined gearing quality, a desired surface finish, a desired tooth flank geometry, a desired tooth gap geometry, in particular the desired tooth flank profile, and/or further predetermined quality requirements have been achieved or could be complied with in the machining operation performed on a CNC machine tool.

To this end, it is optionally necessary to unclamp the machined workpiece after the machining operation on the CNC machine tool from a clamping means of the machine tool and to subsequently check in a test system whether the above mentioned, given quality requirements have been achieved or complied with. If it turns out here that a desired target gearing geometry could not be achieved in the machining operation performed on a CNC machine tool, the workpiece must optionally be remachined or finished on another machine or be machined again after reclamping it in the CNC machine tool.

SUMMARY OF THE INVENTION

It is thus an object of the present invention to provide a machine tool for machining a workpiece by means of one or more tools controlled by control data on a machine tool comprising at least 5 axes and avoiding the problems of the above described processes for the production of finished parts having a gearing.

A further object of the present invention is to provide a machine tool and a process for machining a workpiece having a gearing using one or more tools controlled by means of control data, which optimizes a production of finished parts having a gearing on a machine tool comprising at least 5 axes as compared to the above described prior art processes by optimizing in particular the manufacturing process with respect to a quality inspection so as to avoid quality inspections in additional machines, in particular to avoid time-consuming clamping and unclamping operations of the workpiece to be produced, optionally for a remachining or finishing operation.

The above described objects of the present invention are achieved by a machine tool for machining a workpiece with at least 5 simultaneously controllable axes according to claim 1 and a process for the machining of a workpiece by a machine tool according to claim 16. Preferred embodiments are described in the dependent claims.

A machine tool for the machining, in particular program-controlled machining, of a workpiece by means of one or more tools controlled by means of control data according to the present invention comprises at least 5 simultaneously controllable axes and furthermore a clamping means for clamping the workpiece and a control device including a support means for supporting one of the one or more tools of the machine tool, the control device being suited to control the tool supported in the support means by means of the control data along a tool path to remove material from the workpiece clamped in the clamping means.

According to the invention, the machine tool is suited to machine a first workpiece to provide the first workpiece with a first gearing, the first workpiece being a counter piece to a second workpiece having a second gearing such that a first tooth flank of the first gearing forms a mating flank of a second tooth flank of the second gearing.

The machine tool according to the present invention is in particular characterized in that the machine tool comprises a test system suited to determine after and/or during the machining operation of the first workpiece on the machine tool whether a current geometry, in particular a current tooth flank geometry and/or current tooth gap geometry, of the first gearing of the first workpiece differs from a target gearing geometry, in particular from a target tooth flank geometry and/or target tooth gap geometry, of the first gearing of the first workpiece.

This offers the advantage that the machine tool according to the present invention is in particular suited to determine after and/or during the machining operation of the first workpiece on the machine tool whether a current geometry, i.e. the present geometry in a current machining condition during the inspection by the test system, in particular the current tooth flank geometry and/or current tooth gap geometry belonging to this operating state, at least of one tooth flank or at least between two tooth flanks, of the first gearing of the first workpiece differs from the desired target gearing geometry, underlying the machining operation on the machine tool and predetermined in particular prior to the machining operation, of the first gearing of the first workpiece.

Here, the predetermined target gearing geometry preferably specifies e.g. the kind of gearing that is given, e.g. straight gearing, helical gearing, double helical gearing or herringbone gearing, circular arc gearing, spiral gearing, involute gearing or another gearing shape. In addition, the predetermined target gearing geometry preferably indicates parameter values, for example, providing the predetermined tooth flank profile of the finished part to be produced, in particular e.g. parameters relating to the tooth width, tooth height, convexity and/or the predetermined curvature of the tooth flanks, e.g. involute tooth shape, trochoidal tooth shape or another tooth shape.

In a CNC machine tool comprising at least 5 axes, almost any free-form surfaces can be produced on account of the advantageously provided flexibility in the tool control in at least 5 degrees of freedom. Thus, the production of gear wheels having any tooth flanks is conceivable, it being possible for the predetermined target gearing geometry to also contain for this purpose a mathematical description of the tooth flank surfaces, for example.

The present invention provides a machine tool further comprising a test system with which the workpiece and/or the current gearing geometry of the workpiece can be determined after and/or during the machining operation on the machine tool, preferably without unclamping the workpiece from the clamping position in the clamping means of the machine tool. Thus, the present invention can provide a machine tool which along with the machining of the workpiece additionally enables a quality inspection or an inspection of a deviation from a predetermined target gearing geometry so that it is not necessary to employ further machines to check the quality of the achieved gearing shape.

The above described target gearing geometry, in particular the target tooth flank geometry and/or the target tooth gap geometry, of the first gearing of the first workpiece and optionally also a corresponding target gearing geometry of the second gearing of the second workpiece are preferably determined by a gearing quality given for the finished first and/or second workpiece, in particular a given surface finish.

This offers the advantage that the predetermined target gearing geometry which shall be achieved in the machining operation of the workpiece, in particular of a gear wheel, on the machine tool orients itself by a predetermined gearing quality, in particular a predetermined surface finish of the tooth flanks so as to determine by means of a detected deviation of the determined current gearing geometry of the first gearing of the first workpiece from the predetermined target gearing geometry whether the first workpiece clamped in the clamping means of the machine tool and/or the first gearing of the first workpiece complies in the current machining state with the requirements made on a gearing geometry to be achieved, in particular a gearing quality or surface finish to be achieved, or whether it is preferably necessary to remachine the workpiece on the machine tool, optionally in program-controlled fashion, to obtain the desired gearing quality or surface finish.

The first workpiece, in particular in its finished state after the machining operation on the machine tool, is preferably a spur gear having an internal gearing, a spur gear having an external gearing, a toothed rack or a bevel gear and the second workpiece, in particular in the finished state after the machining operation performed on the machine tool, is preferably a spur gear having an internal gearing, a spur gear having an external gearing, a toothed rack or a bevel gear, preferably such that the second workpiece is a counter piece of the first workpiece.

This offers the advantage that in particular spur gears having an internal gearing, spur gears having an external gearing, toothed racks or bevel gears are produced on the machine tool, which together with a second workpiece form a gearing pair, e.g. a gear wheel pair, the second workpiece being a spur gear having an internal gearing, a spur gear having an external gearing, a toothed rack or a bevel gear which in particular can optionally also be produced on a machine tool, optionally before, during or after the machining of the first workpiece.

The above described inspection system of the machine tool preferably comprises a first sensing element suited to determine or detect by means of scanning a tooth flank side of the first gearing of the first workpiece using a sensing element whether the current gearing geometry of the first gearing of the first workpiece differs from the target gearing geometry of the first gearing of the first workpiece.

This offers the advantage that the inspection system of the machine tool enables the mechanical scanning of a tooth flank side of the first gearing of the first workpiece by means of a sensing element to determine the currently existing gearing geometry of the first gearing by mechanical scanning using the sensing element and compare it with the predetermined target gearing geometry of the first gearing. Thus, a possible deviation can be determined or detected. For this purpose, the sensing element is preferably suited to scan the workpiece at different angular positions relative to the workpiece such that the current geometry of one or more tooth flank sides of the first gearing can be determined by mechanical scanning. The sensing element is here preferably suited to be supported in a support means of the control device of the machine tool in analogy to a workpiece of the machine tool so that the sensing element can be controlled by the control device for the mechanical scanning of a tooth flank side of the first gearing. Thus, it is possible to also control the sensing element in analogy to a tool of the machine tool in 5 degrees of freedom relative to the clamped workpiece by means of the at least 5 axes of the machine tool.

The above described test system of the machine tool preferably comprises a second sensing element suited to determine or detect by means of optical and/or inductive scanning of a tooth flank side of the first gearing of the first workpiece whether the current geometry of the first gearing of the first workpiece differs from the target gearing geometry, in particular from a target tooth flank geometry and/or target tooth gap geometry, of the first gearing of the first workpiece.

This offers the advantage that in addition to or instead of the above described mechanical scanning of a tooth flank side by alternative processes a current geometry of the first gearing of the first workpiece can be determined by providing a second sensing element suited to determine a current geometry of the first gearing of the first workpiece by the optical and/or inductive scanning of a tooth flank side of the first gearing. The optical scanning of a tooth flank side can here optionally be made by one or more laser beams at preferably several angular positions relative to the workpiece by an optical scanning means of the machine tool, wherein the term of optical scanning shall here not be understood so as to be limited to a visible wavelength range.

The support means of the machine tool is preferably suited to support the second workpiece.

This offers the advantage of providing a machine tool comprising a support means on the control device of the machine tool, which along with the support of one or more tools of the machine tool or of the above described sensing element or other tools enables the support of the second workpiece, the second workpiece being preferably a spur gear having an external gearing, a spur gear having an internal gearing, a toothed rack or a bevel gear, as described above. Thus, it is possible on the machine tool to support workpieces not only in the clamping means of the machine tool but also in the support means of the control device and optionally control them with the control device of the machine tool by one or more of the at least 5 axes of the machine tool.

The machine tool is preferably suited to control the second workpiece supported in the support means and the first workpiece clamped in the clamping means relative to each other such that the first gearing of the first workpiece and the second gearing of the second workpiece are in engagement and at least one first flank of the first gearing cooperates with at least one first mating flank of the second gearing.

This offers the advantage that the machine tool is in particular suited to control first and second workpieces representing a gearing pair relative to each other so as to engage the teeth of the first gearing of the first workpiece and the second gearing of the second workpiece in accordance with the respectively chosen gearing shape so that a first flank of the first gearing cooperates with at least one first mating flank of the second gearing. This serves for establishing the engagement of the first and second workpieces which occurs or shall occur in an optionally subsequent operation of the first and second workpieces as a gearing pair.

The test system of the machine tool preferably comprises a tooth contact pattern detecting device suited to detect a tooth contact pattern between the first flank of the first gearing and the first mating flank of the second gearing by means of spotting.

This offers the advantage that first and second workpieces, each clamped in the clamping means of the machine tool and the support means of the control device of the machine tool can be engaged so as to detect a tooth contact pattern between the first flank of the first gearing and the first mating flank of the second gearing by means of spotting. Here, the tooth contact pattern detecting device preferably comprises means enabling the application of paint on at least one gearing of the first gearing and second gearing so that when the first flank of the first gearing cooperates with the first mating flank of the second gearing paint from the first flank is transferred to the first mating flank or from the first mating flank to the first flank, the tooth contact pattern detecting device preferably further comprising means suited to determine a tooth contact pattern by optical detection, in particular by the optical detection of the surface of the first flank or the first mating flank onto which paint is transferred when the first mating flank cooperates with the first flank.

This offers the advantage that the machine tool provides in particular a tooth contact pattern detecting device which can optionally detect in automated fashion a tooth contact pattern on the machine tool, in particular a tooth contact pattern in accordance with a current geometry of the gearing of the first workpiece after and/or during the machining operation performed on the machine tool. In order to detect the tooth contact pattern of the current gearing, it is thus not necessary to unclamp a first workpiece from the clamping means of the machine tool to determine a tooth contact pattern optionally manually or on an external machine.

In case the first or second workpiece is a toothed rack, the machine tool is preferably suited to control one or more linear axes of the machine tool for controlling the second workpiece supported in the support means and the first workpiece clamped in the clamping means relative to each other.

This offers the advantage that the first workpiece and the second workpiece can be controlled relative to one another in particular when the teeth are engaged, the actual movement of the first or second workpiece being effected by at least one or more linear axes of the machine tool and optionally by one or more rotational axes of the machine tool. If the first or second workpiece is in this case a toothed rack, the counter piece is a spur gear having an external gearing, a bevel gear, in particular optionally a pinion which can preferably be rotationally driven by a rotational axis of the machine tool about a central axis.

In case the first workpiece and/or the second workpiece is a gear wheel, in particular a bevel gear or spur gear, the machine tool is preferably suited to control one or more rotational axes of the machine tool relative to one another for controlling the second workpiece supported in the support means and the first workpiece clamped in the clamping means.

This offers the advantage that the first workpiece and the second workpiece can be controlled relative to each other on the machine tool when the teeth are engaged. In case the first workpiece and/or the second workpiece is a gear wheel, the machine tool is suited to drive the gear wheel by at least one of the rotational axes of the machine tool preferably about a central axis of the gear wheel. If both the first workpiece and the second workpiece are gear wheels such that the first workpiece and the second workpiece form a gear wheel pair, the machine tool is thus advantageously suited to drive the first workpiece and the second workpiece as an engaging gear wheel pair, the respectively first and second workpieces being preferably driven in each case by a rotational axis about the respective central axis of the gear wheels.

In case the first workpiece is a gear wheel, in particular a bevel gear or spur gear, and the second workpiece is a gear wheel, in particular a bevel gear or spur gear, the machine tool is preferably suited to rotationally drive the first workpiece preferably about a central axis of the first workpiece by means of a first rotational axis which is preferably suited to rotationally drive the clamping means of the machine tool, the machine tool being preferably also suited to rotationally drive the second workpiece preferably about a central axis of the second workpiece by means of a second rotational axis which is preferably suited to rotationally drive the support means of the machine tool.

This offers the advantage that the machine tool is suited to drive a gear wheel pair when the teeth of the gear wheel pair are engaged as predetermined or desired for the subsequent operation of the gear wheel pair. Thus, each of the gear wheels can be rotationally driven with a rotational axis of the machine tool about a respective central axis of the gear wheel, the at least 5 axes of the machine tool enabling the control of an accurate positioning of the gear wheel pair relative to each other so that it is possible to also adjust a rotational tension between the gear wheels, in particular between a gear wheel and the corresponding pinion, optionally by means of the NC functionality of the machine tool. It is thus possible to adjust the position of the gear wheels of the gear wheel pair, in particular of the gear wheel with a corresponding pinion relative to each other, via the 5 NC axes of the machine tool, it being possible to drive a gear wheel optionally via an NC-rotary table, an NC partial apparatus or a fully integrated NC clamping device, and it being possible to furthermore drive the other gear wheel, in particular a pinion, via a work spindle of the machine tool, in particular a work spindle in the control device of the machine tool.

Furthermore, the test system of the machine tool preferably comprises a running characteristics test means suited to determine whether a common running characteristics of the first workpiece and the second workpiece differs from target running characteristics of the first workpiece and the second workpiece while the first workpiece and the second workpiece are preferably controlled relative to each other such that the first gearing of the first workpiece and the second gearing of the second workpiece are in engagement and preferably at least the first flank of the first gearing cooperates with the first mating flank of the second gearing in rolling fashion.

This offers the advantage that the running characteristics of the gearing pair can be checked or determined when the first workpiece and the second workpiece are driven while the teeth of the gearing pair are engaged. Thus, a running characteristics of the gearing pair can be checked or determined on the machine tool when the first workpiece is clamped in the clamping means of the machine tool and the second workpiece in the support means of the control device of the machine tool without the first workpiece to be machined having to be unclamped from the clamping means of the machine tool.

The running characteristics test means preferably comprises one or more acoustic pick-ups and is preferably suited to determine by detecting a running noise occurring when the first workpiece and the second workpiece are driven, preferably by the one or more acoustic pick-ups whether common running characteristics of the first workpiece and the second workpiece differ from target running characteristics of the first workpiece and the second workpiece while the first workpiece and the second workpiece are preferably controlled with respect to each other such that the first gearing of the first workpiece and the second gearing of the second workpiece are in engagement and preferably at least the first flank of the first gearing cooperates with the first mating flank of the second gearing in rolling fashion.

This offers the advantage that the machine tool comprises a running characteristics test means which has in particular one or more acoustic pick-ups, optionally preferably at least one acoustic pick-up on the work spindle and/or on a support means of the control device of the machine tool so that when the first workpiece is clamped on the machine tool the running characteristics of a gearing pair can be determined, in particular by detecting or recording running noises occurring when the first and second workpieces can be controlled as a gearing pair with engaged teeth so that a first flank of the first gearing of the first workpiece cooperates in rolling fashion with a first mating flank of the second gearing of the second workpiece as provided in a subsequent operation of the gearing pair. This offers the advantage that the inspection of the running characteristics or the testing of the running noises of the gearing pair can be determined on the machine tool.

The running characteristics test means preferably comprises one or more vibration sensors and is preferably suited to determine by detecting vibrations occurring when the first workpiece and the second workpiece are driven preferably by one or more vibration sensors whether common running characteristics of the first workpiece and the second workpiece differ from target running characteristics of the first workpiece and the second workpiece while the first workpiece and the second workpiece are preferably controlled relative to each other such that the first gearing of the first workpiece and the second gearing of the second workpiece are in engagement and preferably at least the first flank of the first gearing cooperates in rolling fashion with the first mating flank of the second gearing.

This offers the advantage that instead of or in addition to the determination of the running characteristics by acoustic pick-ups it is also possible to detect the running characteristics of the gearing pair by detecting by one or more vibration sensors vibrations, in particular vibrations resulting from the running characteristics or rolling characteristics of the flanks on mating flanks while the first and second workpieces are controlled relative to each other when their teeth are engaged.

The above described tests of the running characteristics of the first workpiece and the second workpiece relative to each other enable on the whole the detection of a deviation from the target gearing geometry when the noise level of the running characteristics or the running noises is optionally at times above a noise level corresponding to the target gearing geometry or when vibrations are found indicating that a flank shape in accordance with the target gearing geometry has not, or not yet, been achieved.

The machine tool is preferably suited to remachine the first workpiece clamped in the clamping means on the machine tool by a tool held in the control device by a support means, preferably when the test system detects after and/or during the machining operation of the first workpiece on the machine tool that a current geometry, in particular a current tooth flank geometry and/or current tooth gap geometry, of the first gearing of the first workpiece differs from a target gearing geometry, in particular from a target tooth flank geometry and/or target tooth gap geometry, of the first gearing of the first workpiece.

This offers the advantage that the machine tool is suited to remachine the first workpiece clamped in the clamping means when a deviation of the current gearing geometry from the predetermined target gearing geometry is determined without the first workpiece having to be clamped and unclamped.

Thus, the machine tool is in particular suited to enable a complete machining operation of a workpiece having a gearing by machining the workpiece on the machine tool from a blank into a finished part, the complete machining operation optionally comprising the prefabrication and furthermore comprising the provision of the first workpiece with the teeth shape, the machine tool being suited to carry out after and/or during the machining operation of the first workpiece on the machine tool the testing of the teeth shape by means of a target gearing geometry without a necessary clamping or unclamping of the workpiece and optionally carry out a remachining operation to achieve an aspired surface finish, aspired gearing quality, in particular an aspired target gearing geometry. If it is here found in particular that the current gearing geometry of the first gearing of the first workpiece corresponds to the aspired target gearing geometry or if it is detected that the deviation between the current gearing geometry and the target gearing geometry falls below a predetermined maximum deviation, this indicates that the first workpiece or the first gearing on the first workpiece corresponds to the requirement made by the target gearing geometry.

According to the present invention, the inventive process for machining a workpiece by means of one or more workpieces controlled by means of control data on a machine tool as described above comprises the process steps of:
  determining a target gearing geometry, in particular a target tooth flank geometry and/or target tooth gap geometry, of the first gearing of the first workpiece, and
  machining a first workpiece clamped in the clamping means of the machine tool to produce a first gearing on the first workpiece by means of the determined target gearing geometry, the first workpiece being a counter piece to a second workpiece having a second gearing such that a first tooth flank of the first gearing forms a mating flank of a second tooth flank of the second gearing.

The process according to the invention is in particular characterized by the process step of determining after and/or during the machining operation of the first workpiece on the machine tool whether a current geometry, in particular a current tooth flank geometry and/or current tooth gap geometry, of the first gearing of the first workpiece differs from the determined target gearing geometry, in particular from a target tooth flank geometry and/or target tooth gap geometry, of the first gearing of the first workpiece.

Also, the process according to the invention preferably comprises one or more of the following process steps:
  mechanical scanning of a tooth flank side of the first gearing of the first workpiece by means of a sensing element to determine whether the current gearing geometry of the first gearing of the first workpiece differs from the target gearing geometry of the first gearing of the first workpiece,
  optical scanning of a tooth flank side of the first gearing of the first workpiece to determine whether the current gearing geometry of the first gearing of the first workpiece differs from the target gearing geometry of the first gearing of the first workpiece, and
  inductive scanning of a tooth flank side of the first gearing of the first workpiece to determine whether the current gearing geometry of the first gearing of the first workpiece differs from the target gearing geometry of the first gearing of the first workpiece.

Furthermore, the process preferably comprises the process steps of:
  supporting the second workpiece preferably in the support means of the machine tool,
  controlling the second workpiece supported in the support means and of the first workpiece clamped in the clamping means relative to each other such that the first gearing of the first workpiece and the second gearing of the second workpiece are preferably in engagement and preferably at least one first flank of the first gearing cooperates with at least one first mating flank of the second gearing, and/or determining the tooth contact pattern between the first flank of the first gearing and the first mating flank of the second gearing preferably by means of spotting.

Furthermore, the process preferably comprises the process steps of:

supporting the second workpiece in the support means of the machine tool, controlling the second workpiece supported in the support means and of the first workpiece clamped in the clamping means preferably relative to each other such that the first gearing of the first workpiece and the second gearing of the second workpiece are preferably in engagement and preferably at least one first flank of the first gearing cooperates in rolling fashion with at least one first mating flank of the second gearing, and/or determining whether common running characteristics of the first workpiece and the second workpiece differ from target running characteristics of the first workpiece and the second workpiece, preferably while the first workpiece and the second workpiece are controlled relative to each other such that the first gearing of the first workpiece and the second gearing of the second workpiece are preferably in engagement and preferably at least the first flank of the first gearing cooperates in rolling fashion with the first mating flank of the second gearing.

Furthermore, the process preferably comprises the process step of remachining or finishing the first workpiece preferably clamped in the clamping means of the machine tool, preferably when after and/or during the machining operation of the first workpiece on the machine tool it is detected that a current geometry, in particular a current tooth flank geometry and/or current tooth gap geometry, of the first gearing of the first workpiece differs from the determined target gearing geometry, in particular from a target tooth flank geometry and/or target tooth gap geometry, of the first gearing of the first workpiece.

Thus, a process for the complete machining of a first workpiece is provided on a machine tool according to the invention, wherein in particular the machining operation performed on the machine tool enables the finishing of a first gearing on the first workpiece, including a quality inspection of the current gearing geometry on the machine tool without a necessary clamping or unclamping of the first workpiece and including a possible remachining when it is detected that the current gearing geometry differs from a predetermined target gearing geometry.

DETAILED DESCRIPTION OF THE FIGURES AND PREFERRED EMBODIMENTS OF THE PRESENT INVENTION

In the following, the present invention is described and explained in detail by means of embodiments of a machine tool for machining a workpiece using one or more tools controlled by means of control data, which comprises at least 5 axes, by means of exemplary figures, corresponding embodiments of the process according to the invention for machining a workpiece on such a machine tool being additionally described.

Figure 1:
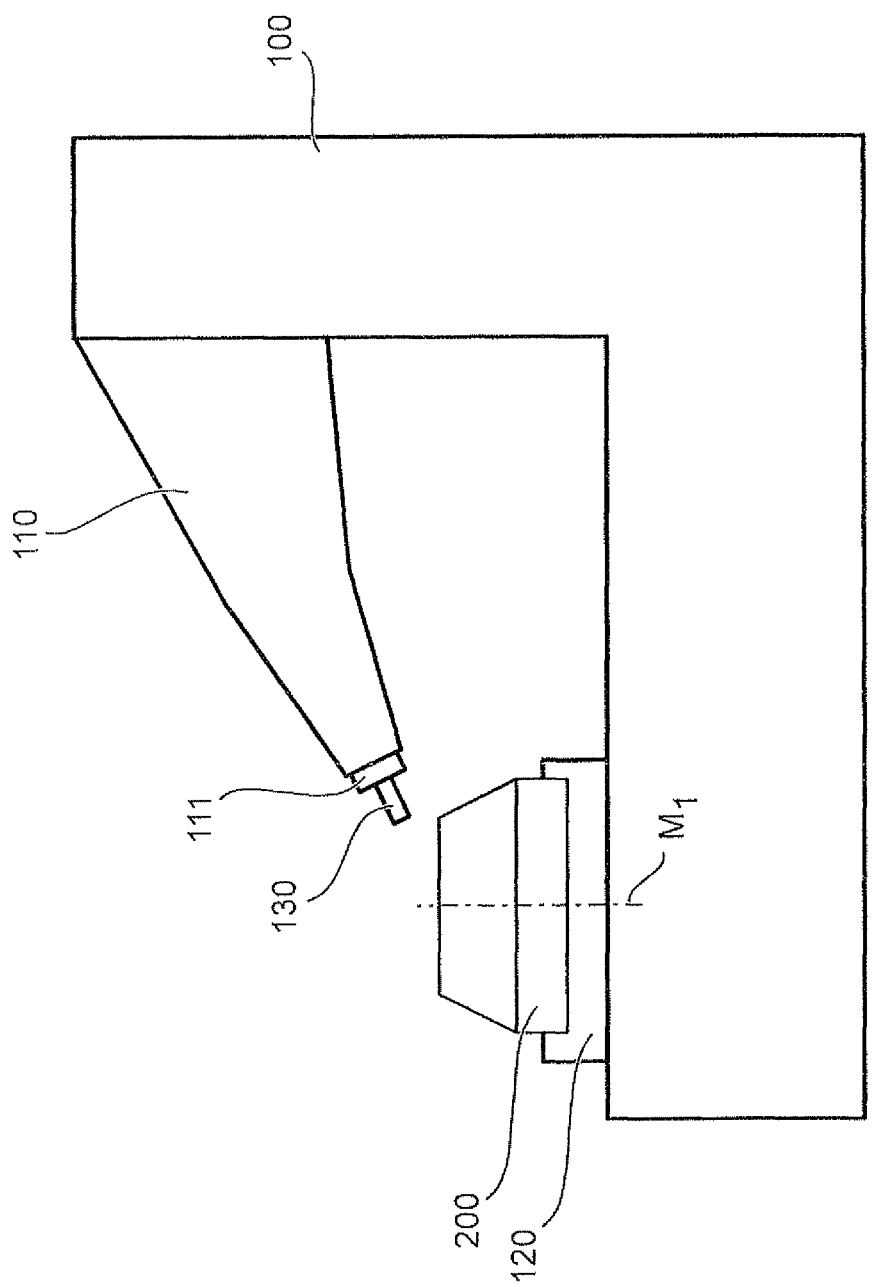
FIG. 1 shows a machine tool for machining a first workpiece according to an embodiment of the present invention.

A first embodiment of a machine tool 100 comprising at least 5 axes is shown in FIG. 1 by way of diagram. The machine tool 100 comprises a control device 110 having a support means 111. The support means 111 of the control device 110 is suited to receive a tool 130 of the machine tool 100. The control device 110 having the support means 111 is here in particular suited to drive a tool 130 of the machine tool 100 such that the tool 130 rotates about an axis of rotation of the tool 130 so as to be suited to remove material from a workpiece 200 to be machined in the machine tool 100 by machining. For this purpose, the machine tool 100 is in particular suited to remove material from the workpiece 200 by moving the tool 130 by means of the control device 110 along tool paths predetermined by control data.

Furthermore, the machine tool 100 comprises a clamping means 120 suited to clamp the workpiece 200 to be machined on the machine tool 100 so that it can be machined by the control device 110 by controlling the workpiece 130. For this purpose, the clamping means 120 according to this embodiment of the present invention is at least suited to rotationally drive the workpiece 200 clamped in the clamping means 120 about a central axis $M_1$ of the workpiece 200 via a rotational axis of the machine tool 100.

All in all, the machine tool according to this embodiment of the present invention is a machine tool 100 comprising at least 5 axes, the machine tool 100 being altogether suited to simultaneously control the tool 130 relative to the workpiece 200 in at least 5 degree of freedom movements by the at least 5 axes of the machine tool 100. The drive is here effected at least via the 5 axes of the machine tool 100, in particular at least 3 linear axes and at least 2 rotational axes.

The workpiece 200 shown in FIG. 1 is the first workpiece 200 which is clamped in the clamping means 120, the first workpiece according to this embodiment of the present invention being in particular a workpiece which is to be machined on the machine tool 100 from a blank into a finished part, according to this embodiment of the machine tool 100 (and the correspondingly described process) the aspired finished part after the finishing step on the machine tool 100 being a bevel gear as the finished part, the first workpiece 200 shown in FIG. 1 showing the workpiece in a current finished state or machining state in which only a basic body which corresponds to a top part of the subsequent bevel gear, is clamped in the clamping means 120. In FIG. 1, the first workpiece 200 was optionally already made or machined from a blank on the machine tool 100.

After an optionally automatic or program-controlled tool change in the machine tool 100, the first workpiece 200 is then machined on the machine tool 100 such that the first workpiece 200 is provided with a gearing, in particular a first gearing, in accordance with a predetermined target gearing geometry by the tool 130 controlled by the control device 110 and optionally by further tools.

It is here possible in particular on account of the 5 degrees of freedom of the controllable relative movement between the tool 130 and the first workpiece 200 to provide by means of machining the first workpiece 200 with any complex gearing shapes, in particular any complex tooth flank geometries and tooth gap geometries, on the machine tool 100.

In particular, the high flexibility of the tool control relative to the workpiece 200 on the program-controlled CNC machine tool 100 enables an automated and program-controlled production of workpieces having a gearing, in particular spur gears with internal and/or external gearing, toothed racks or bevel gears, optionally with automated, program-controlled tool change and/or automated, program-controlled workpiece changes.

Figure 2:
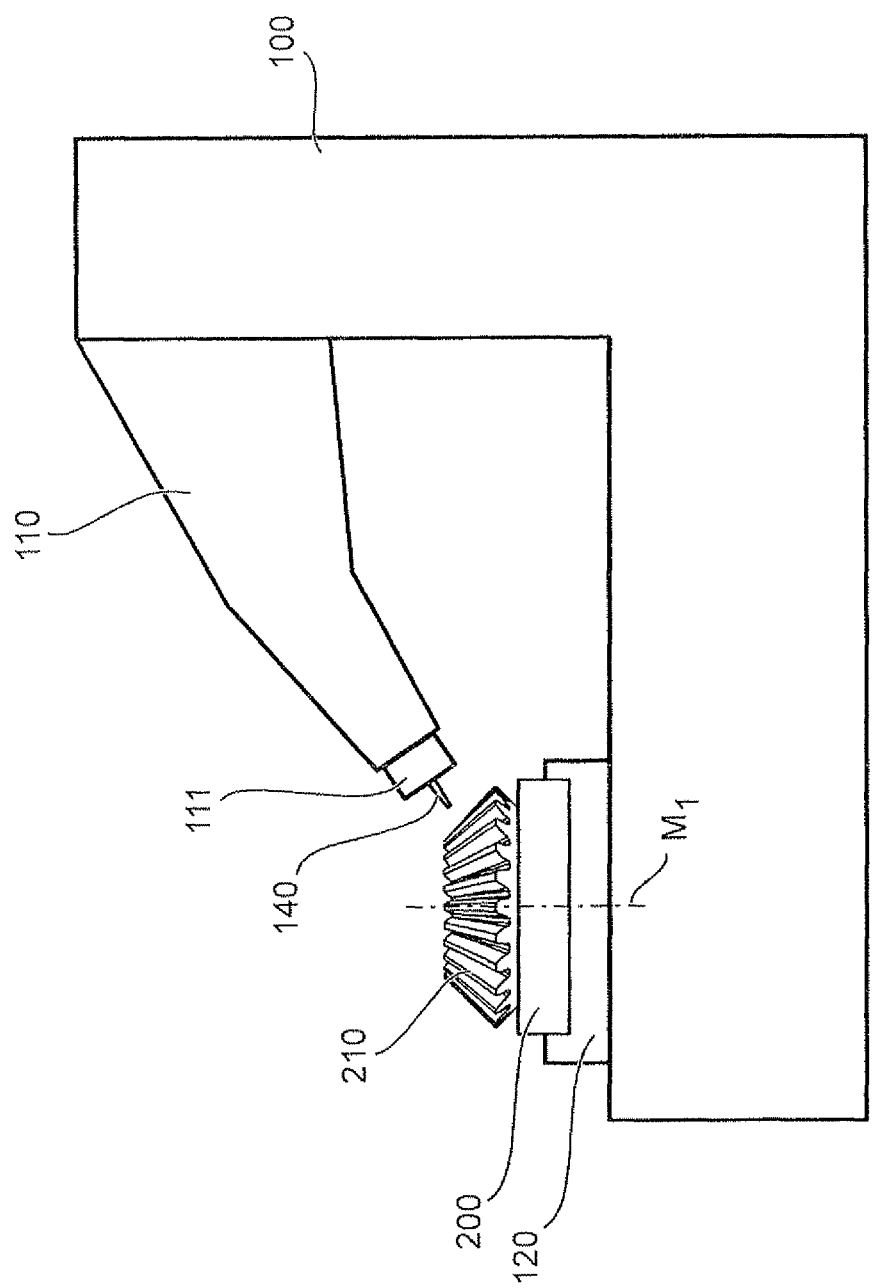
FIG. 2 shows a machine tool for machining a first workpiece according to an embodiment of the present invention.

An embodiment of the present invention is shown in FIG. 2 by way of diagram, FIG. 2 showing a machine tool 100 which shows a control device 110 having a support means 111, the machine tool 100 further comprising in analogy to the machine tool 100 from FIG. 1 a clamping means 120 in which a first workpiece 200 having a first gearing 210 is clamped. For example, the first workpiece 200 in FIG. 2 is the workpiece 200 of FIG. 1 after the workpiece 200 in FIG. 1 was machined with the tool 130. The clamping means 120 is suited to rotationally drive the first workpiece 200 including the first gearing 210 about a central axis of the first workpiece 200, shown by axis $M_1$, the central axis $M_1$ of the first workpiece 200 corresponding to an axis of rotation about which in a subsequent operation the first workpiece 200 which is a bevel gear in FIG. 2, for example, rotates such that it cooperates with a finished part having a mating gearing with respect to the first gearing 210, e.g. a mating gear wheel with respect to the bevel gear, when the teeth of the bevel gear mesh with the teeth of the corresponding mating gear wheel.

In FIG. 2, a sensing element 140 is supported in the support means 111 of the machine tool 100. It is suited to measure a surface of the first workpiece 200 by mechanical scanning, optionally at several points of the surface at different angular positions relative to the first workpiece 200. In particular, the sensing element 140 is suited to mechanically scan, by suitable control by means of the control device 110 at different angular positions, one or more flanks or flank sides of the first gearing 210 of the first workpiece 200 in the current machining state shown in FIG. 2 to determine whether the current gearing geometry of the first gearing 210, in particular the geometry of the tooth flanks or tooth gaps, corresponds to the predetermined target gearing geometry with the required convexity or the required curvature of the tooth flanks with the desired tooth flank course in radial direction or whether the current gearing geometry differs from the predetermined target gearing geometry. For this purpose, the sensing element 140 can scan the surface of the first workpiece 200 at different angular positions by controlling the first workpiece 200 relative to the sensing element 140 on the machine tool 100 by driving the control device 110 and/or the clamping means 120 via one or more of the at least 5 axes of the machine tool 100, in particular the at least 3 linear axes and at least 2 rotational axes.

The machine tool 100 thus comprises a test system which is suited to determine whether the current geometry of the first gearing 210 of the first workpiece 200 differs from the predetermined target gearing geometry, it being possible to check or determine in this embodiment after and/or during the machining of the first workpiece 200 on the machine tool 100 by mechanical scanning using the sensing element 140 whether the current gearing geometry in the current machining state of the first workpiece 200 corresponds to, or differs from, the predetermined target gearing geometry.

However, the present invention is not limited to the conduction of a current gearing geometry by mechanical scanning using a sensing element 140 but it is rather also possible to provide machine tools 100 which comprise a test system according to the invention that includes sensing elements suited to determine by optical or inductive scanning of a tooth flank side of the first gearing of the workpiece whether the current geometry of the first gearing of the first workpiece differs from the target gearing geometry of the first gearing 210 of the first workpiece 200. In addition, it is possible to provide machine tools 100 comprising sensing elements enabling to detect deviations with respect to a predetermined target gearing geometry by a combination of mechanical, optical and/or inductive scanning of a tooth flank side of the first gearing 210. Optical scanning can here be effected by means of a laser beam at different angular positions relative to the workpiece, for example.

In particular, it is possible when it is determined or detected that the current gearing geometry of the first gearing 210 differs from the target gearing geometry, to carry out a tool change in automated fashion, e.g. the sensing element 140 supported in the support means 11 in FIG. 2 being exchanged with the tool 130 shown in FIG. 1 or another tool of a tool magazine of the machine tool 100 to optionally further machine or finish the first workpiece 200 clamped in the clamping means 120 to approximate the current gearing geometry of the first workpiece 200 to the target gearing geometry until the former corresponds to the target gearing geometry or at least differs from it by less than a predetermined maximum deviation. In particular, this concerns to a deviation of a current surface finish of the tooth flanks from a target surface finish and/or a current or currently determined gearing quality from a target gearing quality.

Figure 3:
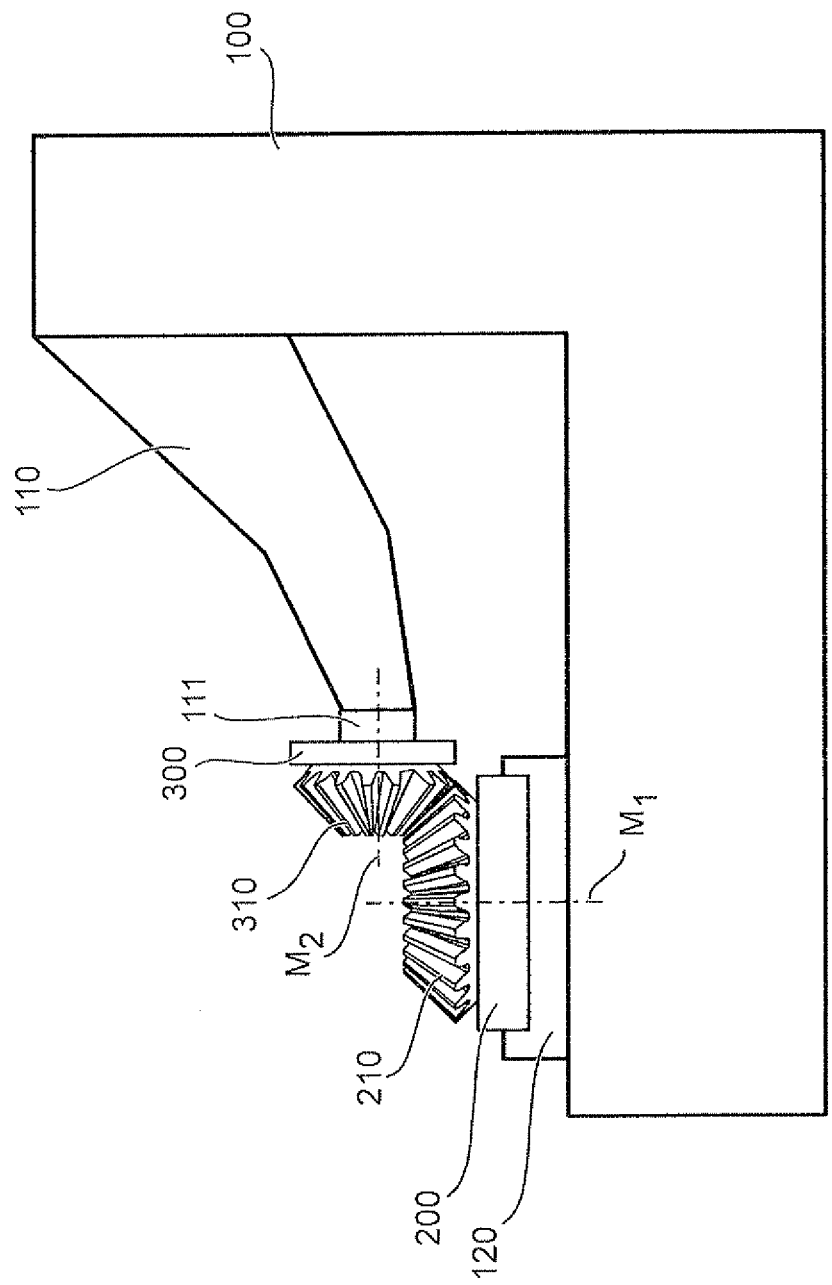
FIG. 3 shows a machine tool for machining a first workpiece according to an embodiment of the present invention.

In a further embodiment of the present invention, a machine tool 100 can be provided with which running characteristics of the first workpiece 200 can be checked or determined without unclamping the first workpiece 200 from the clamping means 120. FIG. 3 here shows by way of example a bevel gear which is clamped as a first workplace 200 having the first gearing 210 in the clamping means 120, the clamping means 120 being suited to rotationally drive the bevel gear 200 about the central axis $M_1$, the central axis $M_1$ corresponding to the axis of rotation of the bevel gear 200.

The machine tool 100 shown in FIG. 3 according to an embodiment of the present invention is suited to receive a second workplace 200 having a gearing 310 by means of a support means 111 of a control device 110 and rotationally drive it about a central axis $M_2$ of the second workpiece 300. By way of example, the second workpiece 300 in FIG. 3 is a bevel gear or a pinion which with the bevel gear 200 forms a gear wheel pair or at least is to form a gear wheel pair under the condition assumed to be exemplary for this embodiment that the first gearing 210 of the bevel gear 200 substantially corresponds to the predetermined target gearing geometry. The bevel gear 300, hereinafter referred to as pinion 300, is here thus e.g. a test pinion or a workpiece which, if desired, was also previously produced or machined in program-controlled fashion on the machine tool 100.

The control device 110 and the clamping means 120 of the machine tool 100 enable the engagement of the pinion 300 and the bevel gear 200 relative to each other by the free mobility and/or the controllability in 5 degree of freedom movements by simultaneously controlling the at least 5 axes of the machine tool 100 such that the first gearing 210 of the bevel gear 200 and the second gearing 310 of the pinion 300 mesh or are in engagement such that a first flank of the first gearing 210 cooperates with a corresponding first mating flank of the second gearing 310.

The machine tool 100 according to an embodiment of the present invention also comprises means enabling the application of paint at least on a first mating flank of the second gearing 310 or on at least one first flank of the first gearing 210 so as to determine a tooth contact pattern by spotting as the control device 110 engages the pinion 300 with the bevel gear 200 such that the first mating flank of the second gearing 310 cooperates with the first flank of the first gearing 210 so as to transfer paint from the first mating flank to the first flank or from the first flank to the first mating flank, an optical detecting means of the machine tool 100 being suited on account of the shape of the transferred paint on the first flank or the first mating flank to determine a tooth contact pattern by optical detection.

After a further embodiment of the present invention, the machine tool 100 in FIG. 3 is additionally suited to simultaneously control the pinion 300 and the bevel gear 200 by the at least 5 axes of the machine tool 100 so as to engage the teeth of the pinion 300 with those of the bevel gear 200, the pinion 300 being rotationally driven by a rotational axis of the control device 110 about the central axis $M_2$ of the pinion 300 and the bevel gear 200 being rotationally driven by a rotational axis of the clamping means 120 about the central axis $M_1$ of the bevel gear 200 such that the pinion 300 and the bevel gear 200 are controlled as a gear wheel pair in accordance with a subsequent operation, in each case at least one first flank of the first gearing 210 of the bevel gear 200 cooperating in rolling fashion, or substantially cooperating in rolling fashion, with a first mating flank of the second gearing 310 of the pinion 300 when an actual rolling motion can only be obtained when the target gearing geometry has been achieved (e.g. by optimum curvature of the tooth flank profile).

According to this embodiment of the present invention, the machine tool 100 or the test system of the machine tool 100 also comprises acoustic pick-ups and vibration sensors, in particular at least one acoustic pick-up and one vibration sensor on the control device 110 such that the running characteristics of the gear wheel pair formed from bevel gear 200 and pinion 300 can be checked or determined by detecting via the acoustic pick-ups of the test system a running noise or running noises when the pinion 300 and the bevel gear 200 are driven relative to each other and comparing them with an optionally predetermined target running noise, optionally by means of a target noise level. Furthermore, the vibration sensors are suited to measure vibrations during the rolling motion of the first mating flank on the first flank when the gear wheel pair consisting of bevel gear 200 and pinion 300 is driven, said vibrations serving for determining a currently present surface finish or gearing quality or a deviation between current gearing geometry and target gearing geometry.

In this embodiment of the present invention, it is also possible to exchange the pinion 300 with a tool 130, in particular e.g. with tool 130, on the machine tool 100 to remachine or finish in automated fashion the bevel gear 200 or the first gearing 210 of the bevel gear 200 when the inspection of the running characteristics or the determination of the tooth contact pattern as described above shows that the current gearing geometry of the first gearing 210 differs from the target gearing geometry.

However, the present invention is not limited to the above described embodiments. On the contrary, the individual aspects or individual features of the above described embodiments can rather be combined to provide further embodiments of the present invention, in particular further embodiments of the machine tool 100 according to the present invention or the process according to the present invention.

As described above, the present invention provides in particular a machine tool 100 and a process for machining a workpiece 200 on a machine tool 100 which enables the complete machining of a workpiece from a blank into a finished part having a gearing, the machine tool in particular additionally enabling that a current gearing geometry of the workpiece can be checked after and/or during the machining of the workpiece on the machine tool as to whether the current gearing geometry differs from a predetermined target gearing geometry, remachining operations being optionally possible when a deviation has been detected, optionally in automated or program-controlled fashion. In particular in an especially advantageous fashion, it is here not necessary to unclamp the workpiece from the clamping means 120 of the machine tool 100 for an inspection in an external test system to check the gearing quality or the surface finish or the current gearing geometry.

The invention claimed is:

1. A machine tool for machining a workpiece by means of one or more tools controlled by means of control data, the machine tool comprising:
    at least 5 simultaneously controllable axes,
    a clamping means for clamping a first workpiece, and
    a control means having a support means for supporting one of the one or more tools, and
    a control device suited to control the tool supported in the support means by means of the control data along a tool path to remove material from the workpiece clamped in the clamping means,
    wherein:
        the machine tool is suited to machine a first workpiece to provide the first workpiece with a first gearing, and the first workpiece is a counter piece to a second workpiece having a second gearing such that a first tooth flank of the first gearing forms a mating flank of a second tooth flank of the second gearing,
        the machine tool further comprises a test system suited to determine, after and/or during the machining of the first workpiece on the machine tool, whether a current geometry of the first gearing of the first workpiece differs from a target gearing geometry of the first gearing of the first workpiece,
        the same support means for supporting the one or more tools is also suited to support the second workpiece, and
        the machine tool is suited to control the second workpiece supported in the support means and the first workpiece clamped in the clamping means relative to each other such that the first gearing of the first workpiece and the second gearing of the second workpiece are in engagement and at least one first flank of the first gearing cooperates with at least one first mating flank of the second gearing.

2. The machine tool according to claim 1, wherein the target gearing geometry is determined by a gearing quality given for the finished first and/or second workpiece.

3. The machine tool according to claim 1, wherein the first workpiece, in its finished state after being machined on the machine tool, is a spur gear having an internal gearing, a spur gear having an external gearing, a toothed rack or a bevel gear and the second workpiece, in its finished state after being machined on the machine tool, is a spur gear having an internal gearing, a spur gear having an external gearing, a toothed rack or a bevel gear such that the second workpiece is a counter piece to the first workpiece.

4. The machine tool according to claim 1, wherein the test system of the machine tool comprises a first sensing element suited to determine, by means of mechanical scanning of a tooth flank side of the first gearing of the first workpiece by means of a sensing element, whether the current gearing geometry of the first gearing of the first workpiece differs from the target gearing geometry of the first gearing of the first workpiece.

5. The machine tool according to claim 1, wherein the test system of the machine tool comprises a second sensing element suited to determine, by optical and/or inductive scanning of a tooth flank side of the first gearing of the first workpiece, whether the current geometry of the first gearing of the first workpiece differs from the target gearing geometry of the first gearing of the first workpiece.

6. The machine tool according to claim 1, wherein the test system of the machine tool comprises a tooth contact pattern detecting device suited to determine a tooth contact pattern between the first flank of the first gearing and the first mating flank of the second gearing by means of spotting.

7. The machine tool according to claim 1, wherein the first or second workpiece is a toothed rack and the machine tool is suited to control one or more linear axes of the machine tool for controlling the second workpiece supported in the support means and the first workpiece clamped in the clamping means relative to each other.

8. The machine tool according to claim 1, wherein the first workpiece and/or the second workpiece is a gear wheel, and the machine tool is suited to control one or more rotational axes of the machine tool for controlling the second workpiece supported in the support means and the first workpiece clamped in the clamping means relative to each other.

9. The machine tool according to claim 1, wherein the first workpiece is a gear wheel, and the second workpiece is a gear wheel, the machine tool is suited to rotationally drive the first workpiece about a central axis of the first workpiece by means of a first rotational axis suited to rotationally drive the clamping means of the machine tool, and/or the machine tool is suited to rotationally drive the second workpiece about a central axis of the second workpiece by means of a second rotational axis suited to rotationally drive the support means of the machine tool.

10. The machine tool according to claim 9, wherein the first workpiece is a bevel gear or a spur gear, and the second workpiece is a bevel gear or a spur gear.

11. The machine tool according to claim 1, wherein the test system of the machine tool furthermore comprises a running characteristics test means suited to determine whether common running characteristics of the first workpiece and the second workpiece differ from a target running characteristics of the first workpiece and the second workpiece while the first workpiece and the second workpiece are controlled relative to each other such that the first gearing of the first workpiece and the second gearing of the second workpiece are in engagement and at least the first flank of the first gearing cooperates in rolling fashion with the first mating flank of the second gearing.

12. The machine tool according to claim 11, wherein the running characteristics test means comprises one or more acoustic pick-ups and is suited to determine, by detecting a running noise occurring when the first workpiece and the second workpiece are driven by means of the one or more acoustic pick-ups, whether common running characteristics of the first workpiece and the second workpiece differ from target running characteristics of the first workpiece and the second workpiece while the first workpiece and the second workpiece are controlled relative to each other such that the first gearing of the first workpiece and the second gearing of the second workpiece are in engagement and at least the first flank of the first gearing cooperates in rolling fashion with the first mating flank of the second gearing.

13. The machine tool according to claim 11, wherein the running characteristics test means comprises one or more vibration sensors and is suited to determine, by detecting vibrations occurring when the first workpiece and the second workpiece are driven by means of the one or more vibration sensors, whether common running characteristics of the first workpiece and the second workpiece differ from target running characteristics of the first workpiece and the second workpiece while the first workpiece and the second workpiece are controlled relative to each other such that the first gearing of the first workpiece and the second gearing of the second workpiece are in engagement and at least the first flank of the first gearing cooperates in rolling fashion with the first mating flank of the second gearing.

14. The machine tool according to claim 1, wherein the machine tool is suited to remachine or finish the first workpiece clamped in the clamping means on the machine tool by a tool supported in the control device by means of a support means when the test system detects after and/or during the machining of the first workpiece on the machine tool that a current geometry of the first gearing of the first workpiece differs from a target gearing geometry of the first gearing of the first workpiece.

15. Process for machining a workpiece by means of one or more tools controlled by control data on a machine tool according to claim 1, comprising:

determining a target gearing geometry of a first gearing of a first workpiece;

machining the first workpiece, clamped in the clamping means of the machine tool, to provide the first workpiece with a first gearing by means of a certain target gearing geometry, the first workpiece being a counter piece to a second workpiece having a second gearing such that a first tooth flank of the first gearing forms a mating flank of a second tooth flank of the second gearing;

determining after and/or during the machining of the first workpiece on the machine tool, whether the current geometry of the first gearing of the first workpiece differs from the target gearing geometry of the first gearing of the first workpiece;

supporting the second workpiece in the support means of the machine tool; and controlling the second workpiece supported in the support means and the first workpiece clamped in the clamping means relative to each other such that the first gearing of the first workpiece and the second gearing of the second workpiece are in engagement and at least a first flank of the first gearing cooperates with at least one first mating flank of the second gearing.

16. Process for machining a workpiece according to claim 15, further comprising one or more of:

mechanical scanning of a tooth flank side of the first gearing of the first workpiece by means of a sensing element to determine whether the current gearing geometry of the first gearing of the first workpiece differs from the target gearing geometry of the first gearing of the first workpiece, optical scanning of a tooth flank side of the first gearing of the first workpiece to determine whether the current gearing geometry of the first gearing of the first workpiece differs from the target gearing geometry of the first gearing of the first workpiece, and inductive scanning of a tooth flank side of the first gearing of the first workpiece to determine whether the current gearing geometry of the first gearing of the first workpiece differs from the target gearing geometry of the first gearing of the first workpiece.

17. Process for machining a workpiece according to claim 15, further comprising:

determining the tooth contact pattern between the first flank of the first gearing and the first mating flank of the second gearing by means of spotting.

18. Process for machining a workpiece according to claim 15, further comprising:

determining whether common running characteristics of the first workpiece and the second workpiece differ from the target running characteristics of the first workpiece and the second workpiece while the first workpiece and the second workpiece are controlled relative to each other such that the first gearing of the first workpiece and the second gearing of the second workpiece are in engagement and at least the first flank of the first gearing cooperates in rolling fashion with the first mating flank of the second gearing.

19. Process for machining a workpiece according to claim 15, further comprising:

remachining or finishing the first workpiece clamped in the clamping means of the machine tool when it is determined after and/or during the machining of the first workpiece on the machine tool that the current geometry of the first gearing of the first workpiece differs from the target gearing geometry of the first gearing of the first workpiece.

20. The machine tool according to claim 1, wherein the current geometry is a current tooth flank geometry and/or current tooth gap geometry, and the target gearing geometry is a target tooth flank geometry and/or a target tooth gap geometry.

* * * * *